US008959238B2

(12) United States Patent  (10) Patent No.: US 8,959,238 B2
Beyer et al.  (45) Date of Patent: Feb. 17, 2015

(54) SYSTEMS, METHODS AND COMPUTER PROGRAM PRODUCTS FOR PROVIDING ACCESS TO WEB SERVICES VIA DEVICE AUTHENTICATION IN AN IMS NETWORK

(75) Inventors: Loraine Beyer, Hoover, AL (US); Amy Zwarico, Mountain Brook, AL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1187 days.

(21) Appl. No.: 11/654,961

(22) Filed: Jan. 18, 2007

(65) Prior Publication Data

US 2008/0177889 A1  Jul. 24, 2008

(51) Int. Cl.
*G06F 15/16* (2006.01)
*H04L 29/06* (2006.01)
*H04L 29/08* (2006.01)

(52) U.S. Cl.
CPC ............ *H04L 65/1016* (2013.01); *H04L 67/02* (2013.01); *H04L 69/22* (2013.01)
USPC ........... 709/230; 709/227; 370/325; 370/344; 705/40

(58) Field of Classification Search
USPC .......... 709/229, 223, 230, 227; 370/352, 344; 705/40
See application file for complete search history.

(56) References Cited

U.S. PATENT DOCUMENTS

| 1,950,046 | A  | * | 3/1934 | Cone ............................. 239/273 |
| 5,845,267 | A  | * | 12/1998 | Ronen ............................. 705/40 |
| 6,934,756 | B2 | * | 8/2005 | Maes ............................. 709/227 |
| 7,131,137 | B1 | * | 10/2006 | Jason et al. ........................ 726/1 |
| 7,940,740 | B2 | * | 5/2011 | Krishnamurthy et al. ..... 370/344 |
| 7,940,748 | B2 | * | 5/2011 | Beyer et al. ..................... 370/352 |
| 7,950,046 | B2 | * | 5/2011 | Kropivny .......................... 726/3 |
| 2003/0159067 | A1 | * | 8/2003 | Stirbu ............................. 713/201 |
| 2007/0050365 | A1 | * | 3/2007 | Laitinen et al. ................... 707/9 |
| 2007/0192838 | A1 | * | 8/2007 | Laitinen et al. ................... 726/4 |
| 2008/0147737 | A1 | * | 6/2008 | Glasgow et al. ............. 709/207 |

OTHER PUBLICATIONS

R, Levenshteyn and I. Fikouras, Mobile Services Internetworking for IMS and XML Webservices, IEEE Communications Magazine, vol. 44, No. 9, Sep. 10, 2006, pp. 80-87.*
Author Unknown, Change Request: Proposed amendment to 3GPP Proposed S3-030317, Jul. 18, 2003, pp. 1-5.*

* cited by examiner

*Primary Examiner* — Tammy Nguyen
(74) *Attorney, Agent, or Firm* — Myers Bigel Sibley & Sajovec PA

(57) ABSTRACT

An IP Multimedia Subsystem (IMS) network provides access to Web services. A HyperText Transfer Protocol (HTTP) message addressed to a Web Service Provider along with the IMS identifier from a device is received in the IMS network. The IMS network validates registration of the device. The IMS identifier and the HTTP message are communicated to the Web Service Provider. A Web service is conveyed from the Web Service Provider to the device.

17 Claims, 5 Drawing Sheets

SYSTEMS, METHODS AND COMPUTER PROGRAM PRODUCTS FOR PROVIDING ACCESS TO WEB SERVICES VIA DEVICE AUTHENTICATION IN AN IMS NETWORK

BACKGROUND OF THE INVENTION

The present invention relates generally to communication network and, more particularly, to delivering services via communication networks.

The Internet Protocol (IP) Multimedia Subsystem (IMS) is a standard that has been developed to define the control and integration of multimedia services in a core, packet-switched network. In particular, the IMS architecture defines a set of logical functions that use a signaling protocol known as the session initiation protocol (SIP) to establish communication sessions in an IP network. A "session" may be, for example, a one-to-one voice call or a more complex interaction, such as a one-to-many conference call involving multimedia services. SIP may also be used to facilitate voice over IP (VoIP) services, in which voice is transported in IP data packets that are re-assembled and converted into an audio signal for the recipient. IMS may be characterized as a standardized way to connect IP devices and networks using SIP.

A Web service is a reusable piece of software that interacts by exchanging messages over a network. Commonly, Web services use Simple Object Access Protocol (SOAP), a protocol for exchanging XML-based messages. A common messaging pattern in SOAP is the Remote Procedure Call (RPC) pattern, in which one a Web service requester sends a request message to a Web Service Provider, and the Web Service Provider sends a response message that provides the requested service, for example, the result of applying a particular procedure based on parameters passed in the Web service request.

Generally, it is desirable that a Web service have some type of authentication capability, such that unauthorized access to the service may be prevented. A variety of different authentication techniques may be used for Web services, including transmission of credentials to the Web Service Provider with or without encryption, digest techniques in which credentials may be hashed on the client and server and the results compared, and third party certificate approaches wherein a user requests and installs a certificate from a trusted third party (e.g., Verisign, Entrust, etc.), and the Web Service Provider can query the third party to verify credentials as required.

SUMMARY

Some embodiments of the present invention provide methods of operating an IP Multimedia Subsystem (IMS) network to provide access to Web services. A HyperText Transfer Protocol (HTTP) message addressed to a Web Service Provider along with the IMS identifier from a device is received in the IMS network. The IMS network validates registration of the device. The IMS identifier and the HTTP message are communicated to the Web Service Provider. A Web service is conveyed from the Web Service Provider to the device.

In other embodiments, validating the registration of the device includes querying a home subscriber server (HSS) database to determine if the device has registered with the IMS network.

In still other embodiments of the present invention, the IMS identifier is an IP Multimedia Private Identity (IMPI), and/or an IP Multimedia Public Identity (IMPU).

In still other embodiments of the present invention, communicating the IMS identifier and the HTTP message to the Web Service Provider includes formatting a SOAP message to include the IMS identifier for the device and transmitting the SOAP message with the HTTP message to the Web Service Provider.

In still other embodiments of the present invention, transmitting the SOAP message with the HTTP message includes digitally signing the SOAP message and/or the HTTP message in the IMS network and transmitting the SOAP message with the HTTP message including the digital signature via a secure communication link outside of the IMS network.

In still other embodiments of the present invention, communicating the IMS identifier in the HTTP message to the Web Service Provider includes adding the IMS identifier for the device to a header portion of the HTTP message and transmitting the HTTP message to the Web Service Provider.

In still other embodiments of the present invention, transmitting the HTTP message includes digitally signing the HTTP message in the IMS network and transmitting the HTTP message including the digital signature via a secure communication link outside of the IMS network.

In still other embodiments of the present invention, the device is an Internet Protocol (IP) device.

In further embodiments of the present invention, a device may access Web services by registering with an IMS network. An HTTP message addressed to a Web Service Provider is transmitted along with an IMS identifier to the IMS network. A Web service is received from the Web Service Provider without conducting an authentication communication corresponding to the transmitted HTTP message.

In other embodiments of the present invention, a Web service system may receive an IMS identifier and an HTTP message from a device via an IMS network. The Web service system identifies the device via the IMS identifier. A Web service is provided to the device via the IMS network responsive to the identification of the device.

In still other embodiments of the present invention, receiving the IMS identifier includes receiving a SOAP message that includes the IMS identifier for the device.

In still other embodiments of the present invention, the HTTP message includes a header portion. The header portion includes the IMS identifier.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
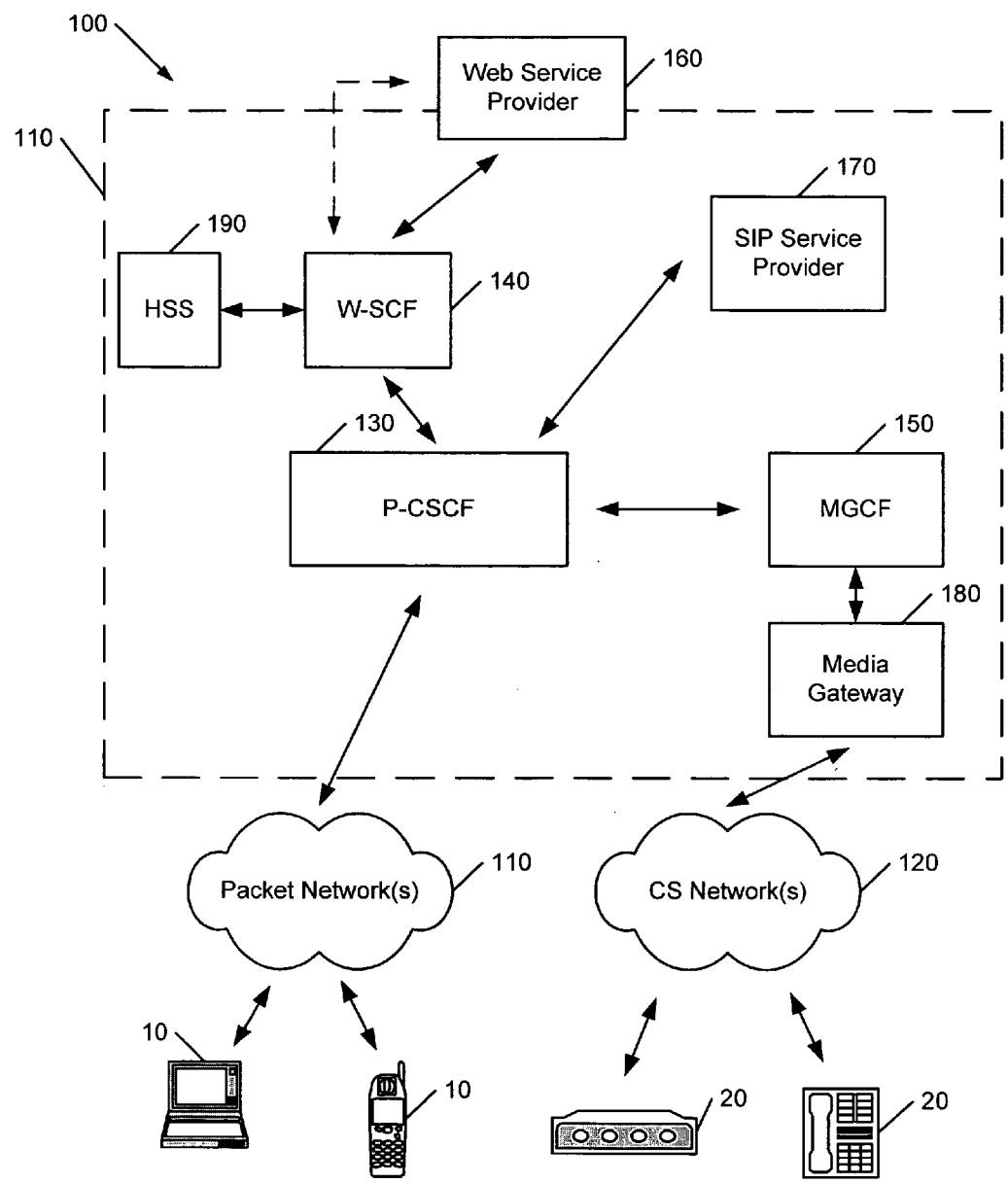
FIG. 1 is a block diagram that illustrates a communication network architecture for providing access to Web services via device authentication in an Internet Protocol (IP) Multimedia Subsystem (IMS) network, in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "IP terminal or device" refers to a terminal or device that may communicate using the session initiation protocol (SIP). It will be understood that an IP terminal or device may also refer to devices that communicate using SIP via a media gateway, which translates communications, for example, between an IP network and another network, such as the public switched telephone network or a circuit switched wireless network. As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

Some embodiments of the present invention stem from a realization that characteristics of IMS may be advantageously used to support Web services delivery. In particular, in some embodiments of the present invention, Web services may be delivered in an authenticated manner using session identification capabilities of IMS, such that authentication communications between a device requesting a Web service and the Web Service Provider are not required.

Referring now to FIG. 1, an exemplary communication network 100, in accordance with some embodiments of the present invention, comprises an IMS network 110 that is coupled to packet switching network(s) 110 and circuit switched network(s) 120, which may provide connectivity to the IMS network 110 for devices 10, 20, such as cell phones, WiFi-equipped computing devices, conventional telephones, modems, and other devices. A device may connect to the IMS network 110 using any of a number of different interfaces, generally depending on the nature of the device. The devices 10, 20 may include IP devices that are capable of communicating via SIP.

The IMS network 110, in accordance with some embodiments of the present invention, comprises apparatus configured to provide a variety of different functions linked by standardized interfaces. Generally, functions of the IMS network 110 include a bundle of functions of SIP servers or proxies, collectively referred to as a Call Session Control Function (CSCF), which are used to process SIP signaling packets in the IMS network 1100. It will be appreciated that the CSCF may be implemented as a single server, separate servers, or a network of servers either co-located in a server farm, for example, or located in different geographic regions. Functions of the CSCF may include: registration of devices with the IMS network 110; routing and inspection of signaling messages; authentication of users and establishment of security associations; compression, decompression and other signal processing functions; authorization of resources; policy enforcement; bandwidth management; and generation of charging records. It will be understood that, in accordance with some embodiments of the present invention, these functions may be apportioned among several call session control function proxies or servers, such as a Proxy-CSCF (P-CSCF) 130, Web-Services Control Function (W-SCF) 140, Media Gateway Control Function (MGCF) 150, Interrogating-CSCF (I-CSCF), Serving-CSCF (S-CSCF), and various other functions, gateways and the like.

The P-CSCF 130 may be configured as a SIP proxy to function as an interface to the IMS network 110 for IP terminals/devices 10, 20. The P-CSCF 130 may enable the registration of IP terminals/devices and the routing of SIP and/or HTTP signaling messages between the devices 10, 20 and service providers, such as the Web Service Provider 160 and the SIP Service Provider 170. The P-CSCF 130 may communicate with devices 10 via the packet network(s) 110 and may communicate with devices 20 via MGCF 150, a media gateway 180, and circuit switched network(s) 120. The MGCF 150 may enable SIP signaling to inter-work with other types of signaling used by the media gateway 180. Thus, the combination of the MGCF 150 and the media gateway 180 may provide an interface between the SIP signaling used in the IMS network 110 and the signaling used in the circuit switched network(s) 120.

The W-SCF 140, in accordance with some embodiments of the present invention, may be configured to allow an authenticated device to request a browser-based or Web service without re-authentication. The W-SCF 140 may receive an IMS identifier for a device from the P-CSCF 130 along with a Web or browser-based service request (i.e., HyperText Transfer Protocol (HTTP) message) and may validate the device by querying a Home Subscriber Server (HSS) database 190, which maintains a service profile and other information for each end-user and associated IP terminal/device that has registered with the IMS network 110. The profile and other information may include, but is not limited to, IP address information, roaming information, and/or telephony services information. Upon validating the IP terminal/device, the W-SCF 140 may forward the device's HTTP request along with the device's IMS identifier to the Web Service Provider 160. As shown in FIG. 1, the W-SCF 140 may forward the HTTP request along with the IMS identifier by using the IMS network 110 or by using a secure communication link outside the IMS network 110, which is represented by the dashed line. In accordance with various embodiments of the present invention, the P-CSCF 130 and W-SCF 140 may be implemented as part of a single entity that resides on a single server or is distributed across multiple servers. The P-CSCF 130 and W-SCF 140 may also be implemented as separate entities that each reside on a single server or is distributed across multiple servers.

The Web Service Provider 160 may receive the device's HTTP request from the W-SCF 140 and identify the device requesting the service from the IMS identifier that is included with the HTTP request. Because the device has been authenticated in the IMS network, the Web Service Provider 160 may provide a Web service to the requesting device without the need to conduct any authentication communication with the device. From the standpoint of a device making a Web service request and a Web Service Provider, some embodiments of the present invention may be viewed as providing a "zero-sign in" authentication service as session identification capabilities of the IMS network may be used to validate the identity of a requesting device and this validated identity may be passed to the Web Service Provider in a secure fashion.

The various elements of the communication network 100 may be connected by a global network, such as the Internet or other publicly accessible network. Various elements of the network may be interconnected by a wide area network, a local area network, an Intranet, and/or other private network, which may not be accessible by the general public. Thus, the communication network 100 may represent a combination of public and private networks or a virtual private network (VPN). Although FIG. 1 illustrates an exemplary communication network, it will be understood that the present invention is not limited to such configurations, but is intended to encompass any configuration capable of carrying out the operations described herein.

The present invention is described hereinafter with reference to flowchart and/or block diagram illustrations of methods, systems, and/or computer program products in accordance with some embodiments of the invention. These flowchart and/or block diagrams further illustrate exemplary operations for operating an IMS network in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 2:
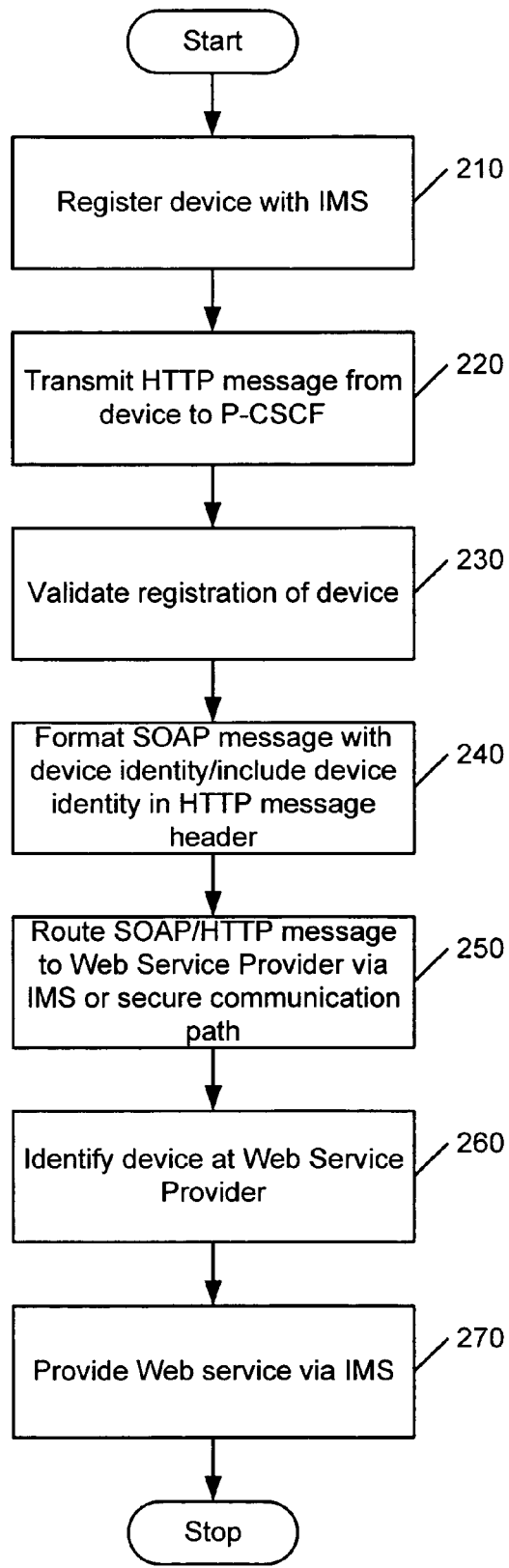
FIGS. 2-4 are flowcharts that illustrate operations for providing access to Web services via device authentication in an IMS network in accordance with some embodiments of the present invention.
Figure 3:
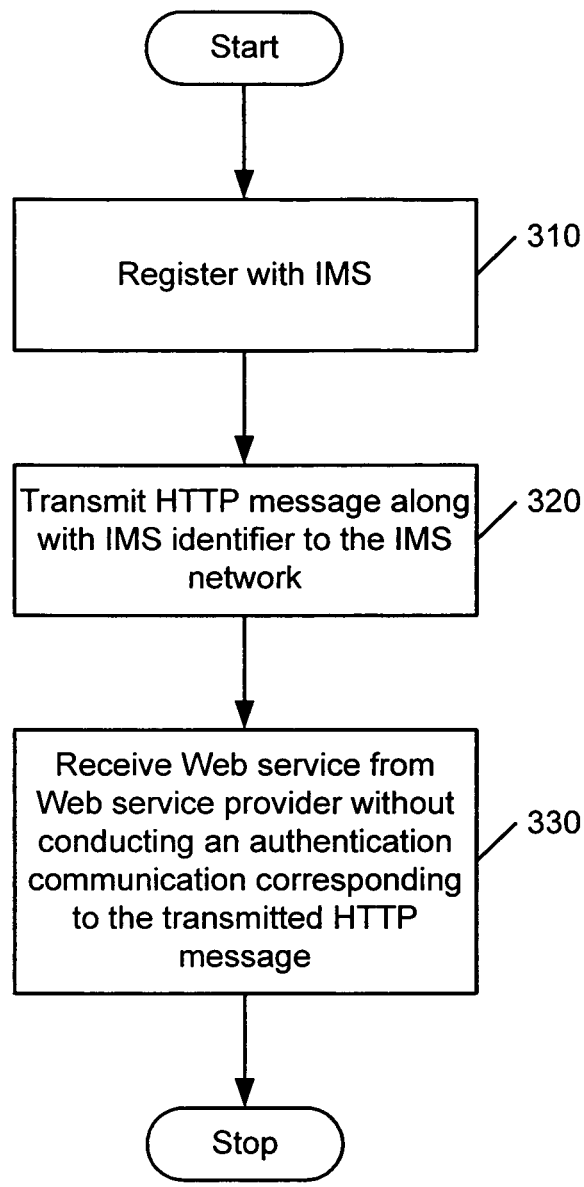
Figure 4:
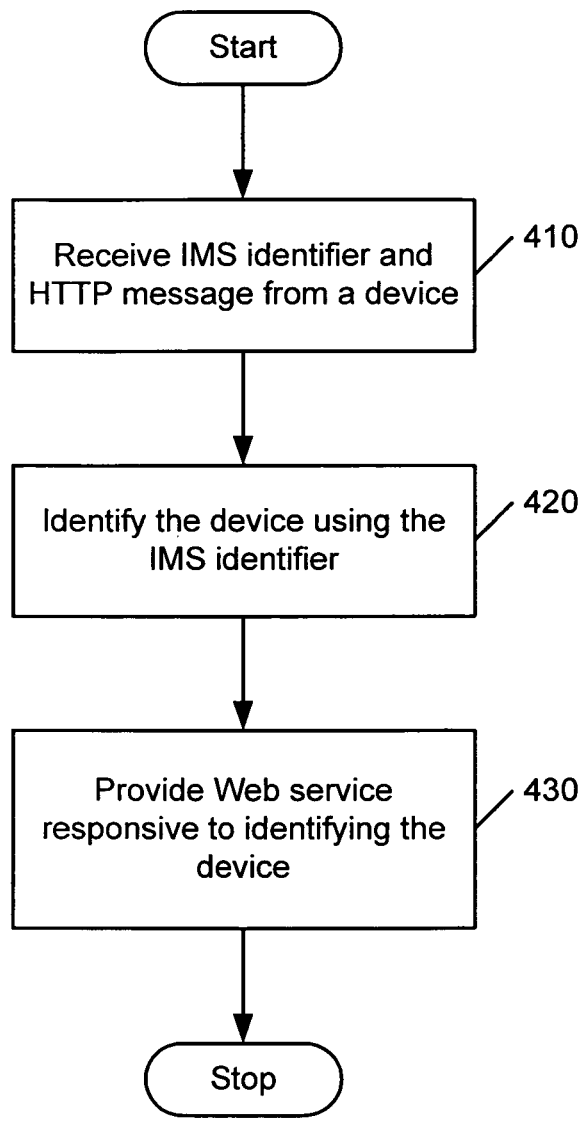

Operations for providing access to Web services via device authentication in an IMS network, in accordance with some embodiments of the present invention, will now be described with reference to FIGS. 2-4 and the communication network architecture of FIG. 1. Referring to FIG. 2, operations begin at block 210 where a device registers with the IMS network 110. When an IP device is powered on, it may go through a registration protocol with the IMS network 110 such that an IMS Public Identity (IMPU) is registered in the HSS 190. At block 220, the device transmits an HTTP message, containing, for example, a request for a browser-based or Web service addressed to the Web Service Provider 160. The P-CSCF 130 receives the HTTP message and identifies the device based on identification information, such as an IMS Private Identity (IMPI) and/or IMPU sent from the device, along with a previously agreed upon encryption key Ck.

At block 230, the P-CSCF 130 forwards the HTTP message and associated IMS identifying information to the W-SCF 140, which validates the registration of the device. To validate registration of the device, the W-SCF 140 queries the HSS 190 to determine if a registration record exists for the device that matches the IMS device identification information (e.g., IMPI and/or IMPU) associated with the HTTP message.

After validating the device, the W-SCF 140 associates the IMS device identification information with the HTTP message for transmission to the Web Service Provider 160. In some embodiments of the present invention, the W-SCF 140 at block 240 formats a Simple Object Access Protocol (SOAP) message to include the IMS device identification information (e.g., IMPI and/or IMPU). In other embodiments, the W-SCF 140 may add the IMS device identification information to the HTTP message header.

At block 250, the W-SCF 140 routes the SOAP message and/or the HTTP message to the Web Service Provider 160. As shown in FIG. 1, the W-SCF 140 may use the secure IMS network 110 to communicate the SOAP message and/or the HTTP message to the Web Service Provider 160. In other embodiments represented by the dashed link between the W-SCF 140 and the Web Service Provider 160, the W-SCF 140 may use a secure communication link outside of the IMS network 110 to communicate the SOAP message and/or the HTTP message to the Web Service Provider 160. The secure communication link may be, for example, a Secure Socket Layer (SSL) tunnel. If the W-SCF 140 uses the secure communication link instead of the IMS network 110 to communicate with the Web Service Provider 160, then the W-SCF 140 may digitally sign the SOAP message and/or the HTTP message to reduce the likelihood of spoofing.

Upon receipt of the SOAP message and/or the HTTP message, the Web Service Provider 160 may identify the device that originated the message at block 260 by using the IMS device identification information that is included in the SOAP message or the HTTP message header. The Web Service Provider 160 may then provide the requested Web service to the device using the IMS network 110 at block 270.

Exemplary operations for operating a device to access Web services according to further embodiments of the present invention will now be described with reference to FIGS. 3 and 1. Operations begin at block 310 where the device registers with the IMS network as described above with respect to block 210 of FIG. 2. The device transmits an HTTP message addressed to a Web Service Provider 160 along with an IMS identifier to the IMS network 110 at block 320. The IMS identifier may be an IMPI and/or an IMPU in accordance with various embodiments of the present invention. The device receives a Web service from the Web Service Provider 160 at block 330 without the need to conduct an authentication communication corresponding to the transmitted HTTP message. The device need not participate in an authentication exchange with the Web Service Provider 160 because the IMS network 110 may authorize the device and provide the Web Service Provider 160 with an identity of the device over a secure interface, e.g., the IMS network infrastructure or a secure communication path outside of the IMS network, such as an SSL tunnel. In this way, some embodiments of the present invention may allow Web Service Providers to offer a "zero sign-in" authentication service to their customers.

Exemplary operations for operating a Web service system to provide Web services according to further embodiments of the present invention will now be described with reference to FIGS. 4 and 1. Operations begin at block 410 where the Web Service Provider 160 receives an HTTP message along with an IMS device identifier from a device via the IMS network 110. The IMS identifier may be an IMPI and/or an IMPU in accordance with various embodiments of the present invention. At block 420, the Web Service Provider 160 identifies the device using the IMS identifier at the Web service system. The Web Service Provider 160 provides a requested Web service to the device via the IMS network 110 at block 430 responsive to the identification of the device.

Figure 5:
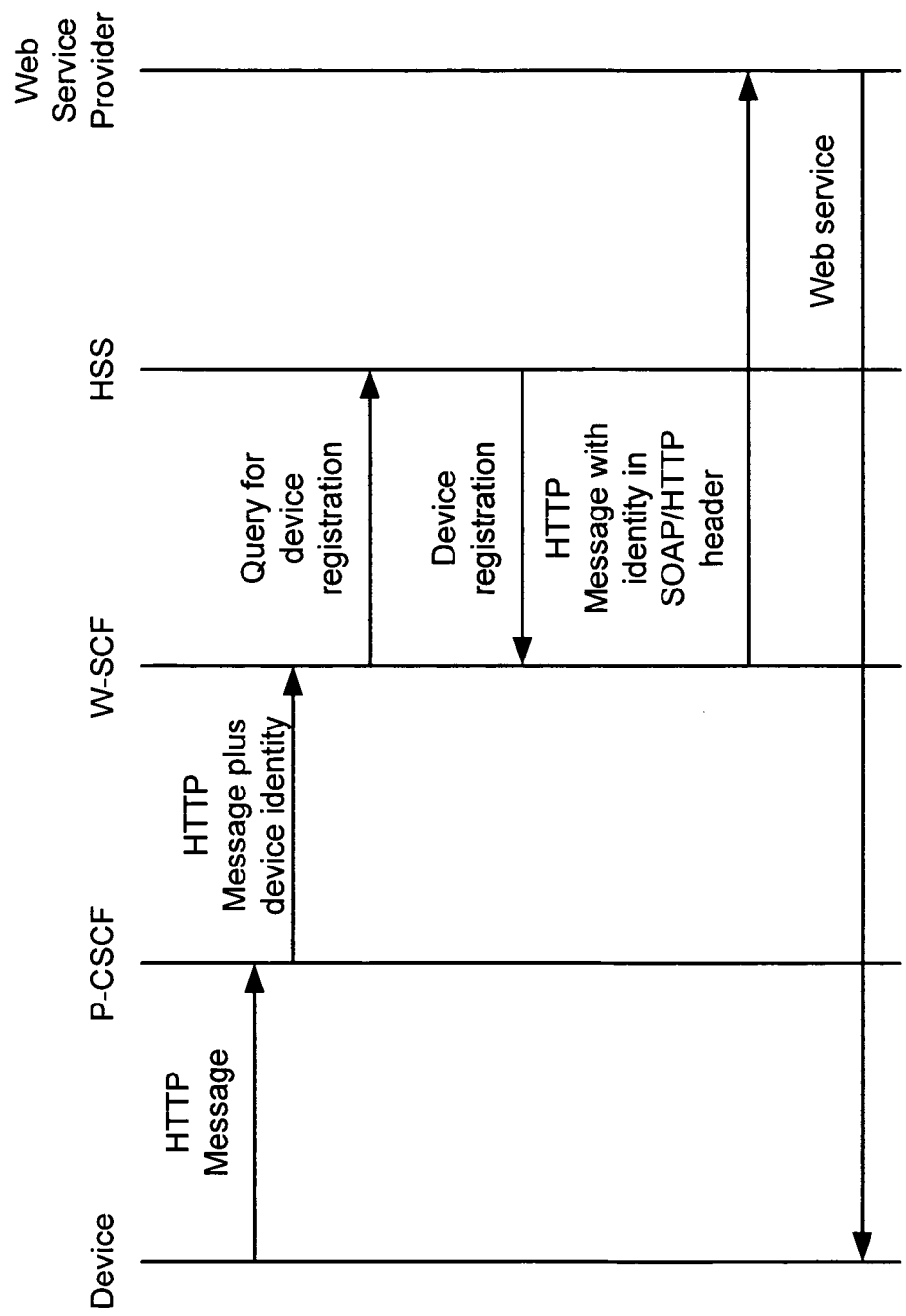
FIG. 5 is a message flow diagram that illustrates operations for providing access to Web services via device authentication in an IMS network in accordance with some embodiments of the present invention.

FIG. 5 is a message flow diagram that illustrates operations for providing access to Web services via device authentication in an IMS network, in accordance with some embodiments of the present invention. Referring to FIG. 5 and FIG. 1, a device that has registered with the IMS network 110 sends an HTTP message addressed to the Web Service Provider 160 to the IMS network where it is received by the P-CSCF. The device identifies itself to the P-CSCF 130 by sending an IMS identifier, such as an IMPI or IMPU, to the P-CSCF 130. The P-CSCF 130 sends the HTTP message plus the IMS device identifier to the W-SCF 140. The W-SCF queries the HSS 190 and, using the IMS device identifier obtained from the P-CSCF 130, confirms that the device has registered with the IMS network 110 upon receiving the device registration back from the HSS 190. After confirming or validating the device's registration, the W-SCF 140 associates the IMS device identification information with the HTTP message for transmission to the Web Service Provider 160. In some embodiments of the present invention, the W-SCF 140 formats a SOAP message to include the IMS device identification information (e.g., IMPI and/or IMPU). In other embodiments, the W-SCF 140 may add the IMS device identification information to the HTTP message header. The SOAP message and/or the HTTP message is transmitted to the Web Service Provider 160. The Web Service Provider identifies the requesting device based on the IMS device identification information contained in the SOAP message or the HTTP message header and provides the requested browser-based or Web service to the device.

Many variations and modifications can be made to the embodiments without substantially departing from the principles of the present invention. All such variations and modifications are intended to be included herein within the scope of the present invention, as set forth in the following claims.

That which is claimed:

1. A method of operating an internet protocol multimedia subsystem network to provide access to web services, comprising:

performing operations as follows, by a processor:

receiving a hypertext transfer protocol message addressed to a web service provider along with an internet protocol multimedia subsystem identifier from a device;

validating registration of the device in the internet protocol multimedia subsystem network responsive to receiving the hypertext transfer protocol message; then communicating the internet protocol multimedia subsystem identifier and the hypertext transfer protocol message to the web service provider via a secure communication link outside of the internet protocol multimedia subsystem network responsive to validating registration of the device; and conveying a web service from the web service provider to the device, wherein communicating the internet protocol multimedia subsystem identifier and the hypertext transfer protocol message to the web service provider comprises:

adding the internet protocol multimedia subsystem identifier for the device to a header portion of the hypertext transfer protocol message; and transmitting the hypertext transfer protocol message to the web service provider.

2. The method of claim 1, wherein validating the registration of the device comprises:

querying a home subscriber server database to determine if the device has registered with the internet protocol multimedia subsystem network.

3. The method of claim 1, wherein the internet protocol multimedia subsystem identifier is an internet protocol multimedia subsystem private identity.

4. The method of claim 1, wherein communicating the internet protocol multimedia subsystem identifier and the hypertext transfer protocol message to the web service provider comprises:

formatting a simple object access protocol message to comprise the internet protocol multimedia subsystem identifier for the device; and transmitting the simple object access protocol message with the hypertext transfer protocol message to the web service provider.

5. The method of claim 4, wherein transmitting the simple object access protocol message with the hypertext transfer protocol message comprises:

digitally signing the simple object access protocol message and the hypertext transfer protocol message in the internet protocol multimedia subsystem network; and transmitting the simple object access protocol message with the hypertext transfer protocol message comprising the digital signature via the secure communication link outside of the internet protocol multimedia subsystem network.

6. The method of claim 1, wherein transmitting the hypertext transfer protocol message comprises:

digitally signing the hypertext transfer protocol message in the internet protocol multimedia subsystem network; and transmitting the hypertext transfer protocol message comprising the digital signature via a secure communication link outside of the internet protocol multimedia subsystem network.

7. The method of claim 1, wherein the device is an internet protocol device.

8. The method of claim 1, wherein the internet protocol multimedia subsystem identifier is an internet protocol multimedia subsystem public identity.

9. A method of operating a web service system, comprising:

performing operations as follows, processor: receiving a simple object access protocol message that comprises an internet protocol multimedia subsystem identifier for a device and a hypertext transfer protocol message from the device via a secure communication link outside of an internet protocol multimedia subsystem network;

identifying the device via the internet protocol multimedia subsystem identifier at the web service system; and providing a web service to the device via the internet protocol multimedia subsystem network responsive to the identification of the device, wherein communicating the internet protocol multimedia subsystem identifier and the hypertext transfer protocol message to the web service provider comprises:

adding the internet protocol multimedia subsystem identifier for the device to a header portion of the hypertext transfer protocol message; and transmitting the hypertext transfer protocol message to the web service provider.

10. The method of claim 9, wherein the internet protocol multimedia subsystem identifier is an internet protocol multimedia subsystem private identity.

11. The method of claim 9, wherein the hypertext transfer protocol message comprises a header portion, the header portion comprising the internet protocol multimedia subsystem identifier.

12. The method of claim 9, wherein the internet protocol multimedia subsystem identifier is internet protocol multimedia subsystem public identity.

13. An internet protocol multimedia subsystem network, comprising:

a server comprising a web-services control function to receive a hypertext transfer protocol message addressed to a web service provider along with an internet protocol multimedia subsystem identifier from a device, to validate registration of the device in the internet protocol multimedia subsystem network responsive to receiving the hypertext transfer protocol message, and then to communicate the internet protocol multimedia subsystem identifier and the hypertext transfer protocol message to the web service provider via a secure communication link outside of the internet protocol multimedia subsystem network responsive to validating registration of the device, wherein communicating the internet protocol multimedia subsystem identifier and the hypertext transfer protocol message to the web service provider comprises:

adding the internet protocol multimedia subsystem identifier for the device to a header portion of the hypertext transfer protocol message; and transmitting the hypertext transfer protocol message to the web service provider.

14. The internet protocol multimedia subsystem network of claim 13, further comprising: a home subscriber server database; wherein the web-services control function is to query the home subscriber server database to determine if the device has registered with the internet protocol multimedia subsystem network.

15. The internet protocol multimedia subsystem network of claim 13, wherein the web-services control function is to format a simple object access protocol message that comprises the internet protocol multimedia subsystem identifier for the device and to transmit the simple object access protocol message with the hypertext transfer protocol message to the web service provider.

16. The internet protocol multimedia subsystem network of claim 15, wherein the web-services control function is to digitally sign the simple object access protocol message and the hypertext transfer protocol message in the internet protocol multimedia subsystem network and to transmit the simple object access protocol message with the hypertext transfer protocol message comprising the digital signature via a secure communication link outside of the internet protocol multimedia subsystem network.

17. The method of claim 13, wherein the web-services control function is to digitally sign the hypertext transfer protocol message in the internet protocol multimedia subsystem network and to transmit the hypertext transfer protocol message comprising the digital signature via the secure communication link outside of the internet protocol multimedia subsystem network.

* * * * *